United States Patent
Agrawal et al.

(10) Patent No.: US 9,214,004 B2
(45) Date of Patent: Dec. 15, 2015

(54) WATERMARKING AND SCALABILITY TECHNIQUES FOR A VIRTUAL DESKTOP PLANNING TOOL

(75) Inventors: Banit Agrawal, Sunnyvale, CA (US); Rishi N. Bidarkar, Sunnyvale, CA (US); Sunil Satnur, Cupertino, CA (US); Vikram Makhija, Castro Valley, CA (US)

(73) Assignee: VMware, Inc., Palo Alto, CA (US)

( * ) Notice: Subject to any disclaimer, the term of this patent is extended or adjusted under 35 U.S.C. 154(b) by 977 days.

(21) Appl. No.: 13/273,071

(22) Filed: Oct. 13, 2011

(65) Prior Publication Data

US 2013/0097426 A1    Apr. 18, 2013

(51) Int. Cl.
G06F 15/16    (2006.01)
G06T 1/00    (2006.01)
G06F 9/44    (2006.01)
G06F 11/34    (2006.01)

(52) U.S. Cl.
CPC ............ *G06T 1/0021* (2013.01); *G06F 9/4445* (2013.01); *G06F 11/3419* (2013.01); *G06F 2201/815* (2013.01); *G06F 2201/86* (2013.01)

(58) Field of Classification Search
CPC ..... H04L 69/16; G06T 1/0021; G06T 1/0028; G06Q 240/00
USPC .................. 709/203, 223, 217, 219; 713/176; 382/317
See application file for complete search history.

(56) References Cited

U.S. PATENT DOCUMENTS

| | | | |
|---|---|---|---|
| 5,933,155 A | 8/1999 | Akeley | |
| 6,168,431 B1 | 1/2001 | Narusawa et al. | |
| 6,381,362 B1 | 4/2002 | Deshpande et al. | |
| 6,421,678 B2 | 7/2002 | Smiga et al. | |
| 6,618,431 B1 | 9/2003 | Lee | |
| 6,876,390 B1 | 4/2005 | Nagata | |
| 7,155,681 B2 | 12/2006 | Mansour et al. | |
| 7,287,275 B2 * | 10/2007 | Moskowitz | 726/13 |
| 7,532,642 B1 | 5/2009 | Peacock | |
| 7,552,467 B2 | 6/2009 | Lindsay | |
| 7,593,543 B1 | 9/2009 | Herz et al. | |
| 7,752,325 B1 | 7/2010 | Yadav et al. | |
| 7,796,978 B2 | 9/2010 | Jones et al. | |
| 7,831,661 B2 | 11/2010 | Makhija et al. | |
| 8,166,107 B2 | 4/2012 | Makhija et al. | |
| 8,347,344 B2 * | 1/2013 | Makhija | H04N 7/173 725/114 |
| 8,788,079 B2 | 7/2014 | Spracklen | |

(Continued)

OTHER PUBLICATIONS

Lawrence Andrew Spracklen et al., U.S. Appl. No. 13/079,972 entitled, "Quality Evaluation of Multimedia Delivery in Cloud Environments", filed Apr. 5, 2011.

(Continued)

*Primary Examiner* — Frantz Jean

(57) ABSTRACT

A method for measuring performance of virtual desktop services offered by a server including a processor is described. A first encoded watermark is embedded into user interface display generated by a virtual desktop when initiating an operation. The first encoded watermark includes pixels identifying the operation and indicating its initiation. A second encoded watermark is embedded into the user interface upon completion of the operation indicating completion of the operation. An action performance time is then computed and stored in a memory. Multiple performance times may be compiled from multiple operations of multiple virtual desktops to assess the performance of the system as a whole.

26 Claims, 13 Drawing Sheets

(56) References Cited

U.S. PATENT DOCUMENTS

| | | |
|---|---|---|
| 2001/0023436 A1 | 9/2001 | Srinivasan et al. |
| 2002/0026505 A1 | 2/2002 | Terry |
| 2002/0056129 A1 | 5/2002 | Blackketter et al. |
| 2002/0138846 A1 | 9/2002 | Mizutani et al. |
| 2002/0165757 A1 | 11/2002 | Lisser |
| 2004/0022453 A1 | 2/2004 | Kusama et al. |
| 2004/0073947 A1 | 4/2004 | Gupta |
| 2004/0137929 A1 | 7/2004 | Jones et al. |
| 2004/0184526 A1 | 9/2004 | Penttila et al. |
| 2004/0221315 A1 | 11/2004 | Kobayashi |
| 2005/0041136 A1 | 2/2005 | Miyata et al. |
| 2005/0138136 A1 | 6/2005 | Potter |
| 2005/0187950 A1 | 8/2005 | Parker et al. |
| 2005/0234715 A1 | 10/2005 | Ozawa |
| 2005/0283800 A1 | 12/2005 | Ellis et al. |
| 2006/0050640 A1 | 3/2006 | Jin et al. |
| 2006/0059095 A1 | 3/2006 | Akins, III et al. |
| 2006/0206491 A1 | 9/2006 | Sakamoto et al. |
| 2007/0003102 A1 | 1/2007 | Fuiii et al. |
| 2007/0125862 A1 | 6/2007 | Uchiyama et al. |
| 2007/0126929 A1 | 6/2007 | Han et al. |
| 2007/0250920 A1 | 10/2007 | Lindsay |
| 2007/0271375 A1 | 11/2007 | Hwang |
| 2007/0291771 A1 | 12/2007 | Cline |
| 2008/0022350 A1 | 1/2008 | Hostyn et al. |
| 2008/0052783 A1 | 2/2008 | Levy |
| 2008/0075121 A1 | 3/2008 | Fourcand |
| 2008/0112490 A1 | 5/2008 | Kamijo et al. |
| 2008/0117937 A1 | 5/2008 | Firestone et al. |
| 2008/0204600 A1 | 8/2008 | Xu et al. |
| 2008/0212557 A1 | 9/2008 | Chiricescu et al. |
| 2008/0263634 A1 | 10/2008 | Kirkland |
| 2008/0297603 A1 | 12/2008 | Hurst |
| 2009/0100164 A1 | 4/2009 | Skvortsov et al. |
| 2009/0210747 A1 | 8/2009 | Boone |
| 2009/0216975 A1 | 8/2009 | Halperin et al. |
| 2009/0259941 A1 | 10/2009 | Kennedy, Jr. |
| 2009/0260045 A1 | 10/2009 | Karlsson et al. |
| 2009/0268709 A1 | 10/2009 | Yu |
| 2010/0161711 A1 | 6/2010 | Makhija et al. |
| 2010/0162338 A1 | 6/2010 | Makhija et al. |
| 2010/0246810 A1* | 9/2010 | Srinivasan et al. .............. 380/28 |
| 2010/0306163 A1 | 12/2010 | Beaty et al. |
| 2011/0023691 A1 | 2/2011 | Iwase et al. |
| 2011/0047211 A1 | 2/2011 | Makhija |
| 2011/0051804 A1 | 3/2011 | Chou et al. |
| 2011/0103468 A1 | 5/2011 | Polisetty et al. |
| 2011/0134763 A1 | 6/2011 | Medina et al. |
| 2011/0138314 A1 | 6/2011 | Mir et al. |
| 2011/0179136 A1* | 7/2011 | Twitchell, Jr. ................ 709/217 |
| 2011/0188704 A1 | 8/2011 | Radhakrishnan et al. |
| 2011/0224811 A1 | 9/2011 | Lauwers et al. |
| 2011/0238789 A1 | 9/2011 | Luby et al. |
| 2012/0036251 A1 | 2/2012 | Beaty et al. |
| 2012/0066711 A1 | 3/2012 | Evans et al. |
| 2012/0073344 A1 | 3/2012 | Fabris |
| 2012/0081580 A1 | 4/2012 | Cote et al. |
| 2012/0113270 A1 | 5/2012 | Spracklen |
| 2012/0140935 A1 | 6/2012 | Kruglick |
| 2012/0167145 A1 | 6/2012 | Incorvia |
| 2012/0246225 A1 | 9/2012 | Lemire |
| 2014/0320673 A1 | 10/2014 | Agrawal et al. |
| 2014/0325054 A1 | 10/2014 | Agrawal et al. |
| 2014/0328203 A1 | 11/2014 | Spracklen |

OTHER PUBLICATIONS

Bhavesh Mehta, U.S. Appl. No. 13/212,054 entitled, "Measurement of Streaming-Audio Quality", filed Aug. 17, 2011.

"Port Forwarding." Wikipedia. Published Feb. 15, 2010. Retrieved from the internet: URL <http://web.archive.org/web/20100215085655/http://en.wikipedia.org/wiki/Port_forwarding>. 3 pages.

Larsen, Vegard. *Combining Audio Fingerprints*. Norwegian University of Science and Technology, Department of Computer and Information Science. Published Jun. 2008. 151 pages.

U.S. Appl. No. 13/872,040, filed Apr. 26, 2013, Remote Display Performance Measurement Triggered by Application Display Upgrade, Agrawal et al.

U.S. Appl. No. 13/872,036, filed Apr. 26, 2013, Measurement of Remote Display Performance with Image-Embedded Markers, Agrawal et al.

* cited by examiner

WATERMARKING AND SCALABILITY TECHNIQUES FOR A VIRTUAL DESKTOP PLANNING TOOL

CROSS REFERENCE TO RELATED APPLICATIONS

This application is related by subject matter to U.S. Pat. No. 7,831,661, issued Nov. 9, 2010, entitled Measuring Client Interactive Performance Using A Display Channel, and to U.S. patent application Ser. No. 12/337,895, filed Dec. 18, 2008, entitled "Measuring Remote Video Playback Performance With Embedded Encoded Pixels," and to U.S. patent application Ser. No. 12/942,393, filed Nov. 9, 2011, entitled "Monitoring Audio Fidelity And Audio-Video Synchronization," and to U.S. patent application Ser. No. 13/079,972, filed Apr. 5, 2011, entitled "Quality Evaluation Of Multimedia Delivery In Cloud Environments," the disclosures of which are incorporated herein by reference.

BACKGROUND

Virtualization of computer resources generally involves the abstraction of computer hardware, which essentially separates operating systems and applications from direct correlation to specific hardware. Hardware is therefore abstracted to enable multiple operating systems and applications to access parts of the hardware, defining a seamless virtual machine. The result of virtualization is that hardware is more efficiently utilized and leveraged.

In a typical virtualized desktop infrastructure (VDI) architecture, user displays and input devices are local, but applications execute remotely in a server. Because applications are executing remotely, a latency element is introduced due to network travel time and application response time. One method of assessing the performance of remote applications is by measuring the response times for various events. These response times are the result of aggregating latency across different components in the architecture. Measuring these latencies, however, is a challenge as measurements must encompass latencies related to both the low level events (such as mouse movements) and the high level events (application launches), as well as work across network boundaries and a range of client devices. While recording the start of an event initiated on the client side is straightforward, accurately characterizing server-dependent events at the client is challenging due to the lack of semantic information and additional mitigating factors such as the use of lossy image compression techniques.

SUMMARY

Embodiments of the present invention provide methods, systems, and computer programs for measuring performance of virtual desktop services offered by a server. Timing information is communicated via binary encoded pixels in watermarks which communicate start and end information, as well as information relating to specific applications and sub-operations.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Embodiments of the invention include methods, systems, and computer programs for measuring performance of virtual desktop services offered by a server. The method includes detection of embedded watermarks in image frames of the virtual desktop. The embedded watermarks define the start and end of specific operations executed on the virtual desktop, and are configured to provide for robust timing detection of these events even under adverse conditions. The stored timing information is used to generate statistical performance data.

The present invention may be practiced without some or all of these specific details. In other instances, well known process operations have not been described in detail in order not to unnecessarily obscure the present invention.

Figure 1:
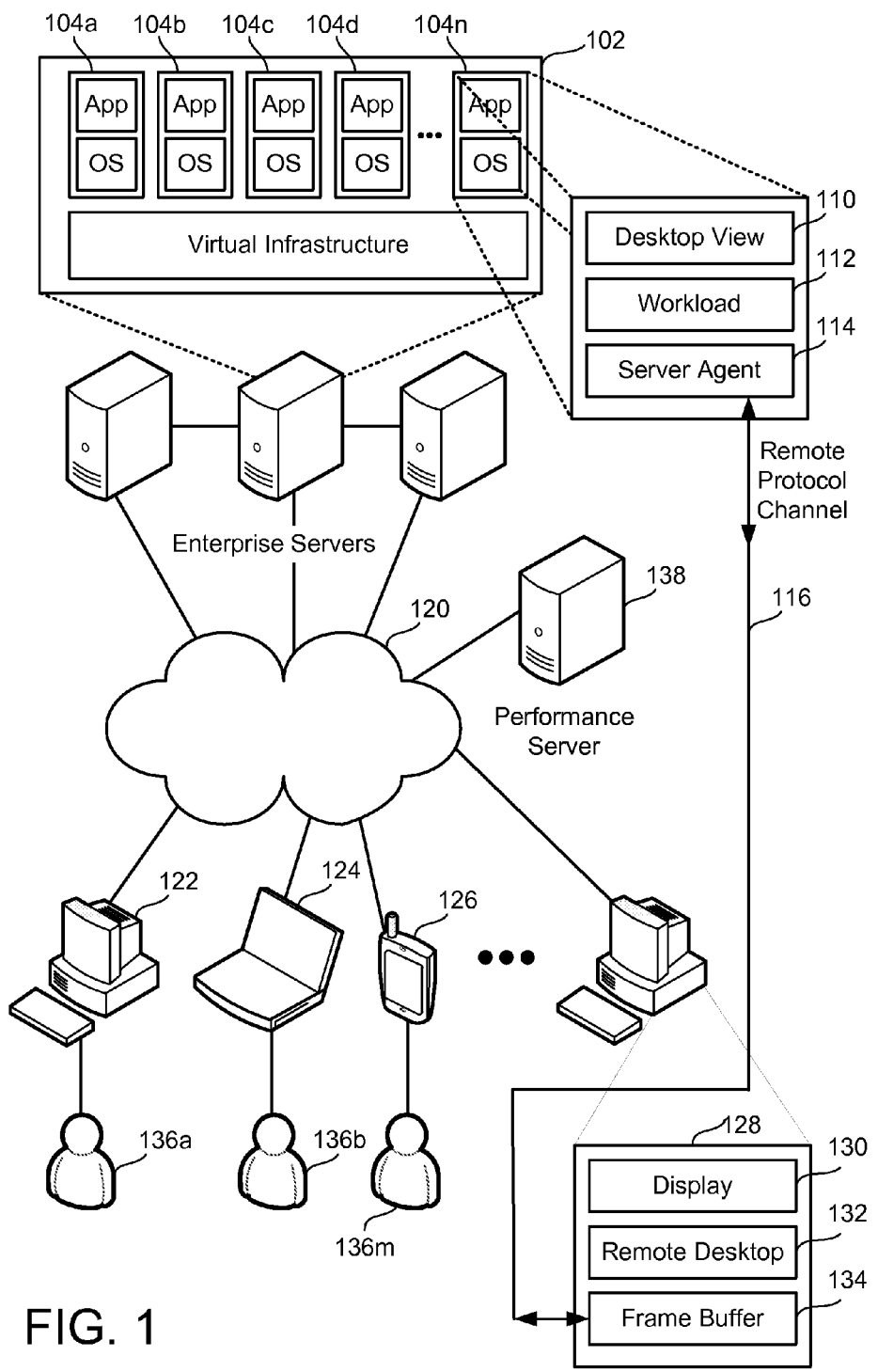
FIG. 1 depicts a remote desktop environment including virtual machine servers, in accordance with an embodiment of the invention.

FIG. 1 depicts a remote desktop environment including virtual machine servers, also referred to as enterprise servers, according to one embodiment. The environment depicted in FIG. 1 includes enterprise servers (only one shown) 102 that provide virtual desktop services to remote users 136a-m. Although embodiments of the present invention are described within a virtual desktop system, the embodiments presented can be used in other environments with a remote display application transmitting display data to a remote client.

A simplified architecture of virtualization server 102 is shown in FIG. 1, with some components omitted for simplification purposes. Virtual infrastructure layer 106 manages the assignment of virtual machines (VM) 104a-n in enterprise server 102 to remote users. Remote users 136*a-m* are connected to computers 122, 124 and 126 acting as clients in the virtual infrastructure. Computers 122, 124 and 126 provide display presentation and input/output capabilities associated with virtual machines 104*a-n*. Clients include PC 122, laptop 124, PDA, mobile phone 126, etc. Clients communicate with virtualization server 102 via network 120.

Virtual machines 104*a-n* include a Guest Operating System (GOS) supporting applications running on the guest OS. A different view of virtual machine 104*n* includes desktop view 110, workload module 112, and server agent 114. Server Agent 114 is a process executing in the VM that processes action requests from local client 128 and provides action start and completion times. On the other end, a local client 128 includes display 130, remote desktop client 132 and frame buffer 134. Desktop view 110 corresponds to the display for the virtual machine, which is transmitted to display 130 at local client 128. The display information is received by frame buffer 134 and remote desktop 132 updates display 130.

A frame buffer is a part of video memory containing a complete frame of data. The information in the buffer typically consists of color values for every pixel on the screen. Color values are commonly stored in 1-bit monochrome, 4-bit palettized, 8-bit palettized, 16-bit highcolor and 24-bit truecolor formats. Virtual Machine 104*n* communicates with the associated local client over network 120 using a remote protocol, such as Remote Desktop Protocol (RDP). Remote Desktop Protocol is a multichannel capable protocol that supports separate virtual channels for carrying presentation data, serial device communication, licensing information, highly encrypted data (keyboard, mouse activity), etc.

Performance server 138 collects performance data from servers and clients and analyzes the data collected for presentation to a user, as described in more detail below. In one embodiment, functions provided by performance server 138 may be instead provided by virtualization server 102.

In one embodiment of a remote computing environment, messaging takes place via the data channel, such as the data channel in RDP, and via the display channel used for screen updates, usually in the form of a new rectangle updates for the display. Events on the two channels corresponding to the same operation are not always synchronous. The moment the display channel completes its update is the moment that the user views and perceives that the task previously requested has completed. Measuring display updates is then crucial to rate user experience when operating in a remote environment. It should be noted that display updates arrive almost always later than the data channel updates for the same operation.

Embodiments of the invention measure the performance of the virtual environment as seen by users 136*a-m*. Control messages are encoded in the display channel (in-band messages) instead of using other out-of-band channels. In many cases, the display channel is the only channel that reaches the client machines because of firewalls and other obstacles between servers and clients. Additionally, the embodiments presented are independent of the communications protocols used to transfer display data, thus being able to reliably obtain performance measurements under different topologies and protocols and assess how different factors affect virtual desktop performance. Further still, the methods presented can scale to tens of thousands of clients and servers without unduly burdening the virtual infrastructure.

Figure 2:
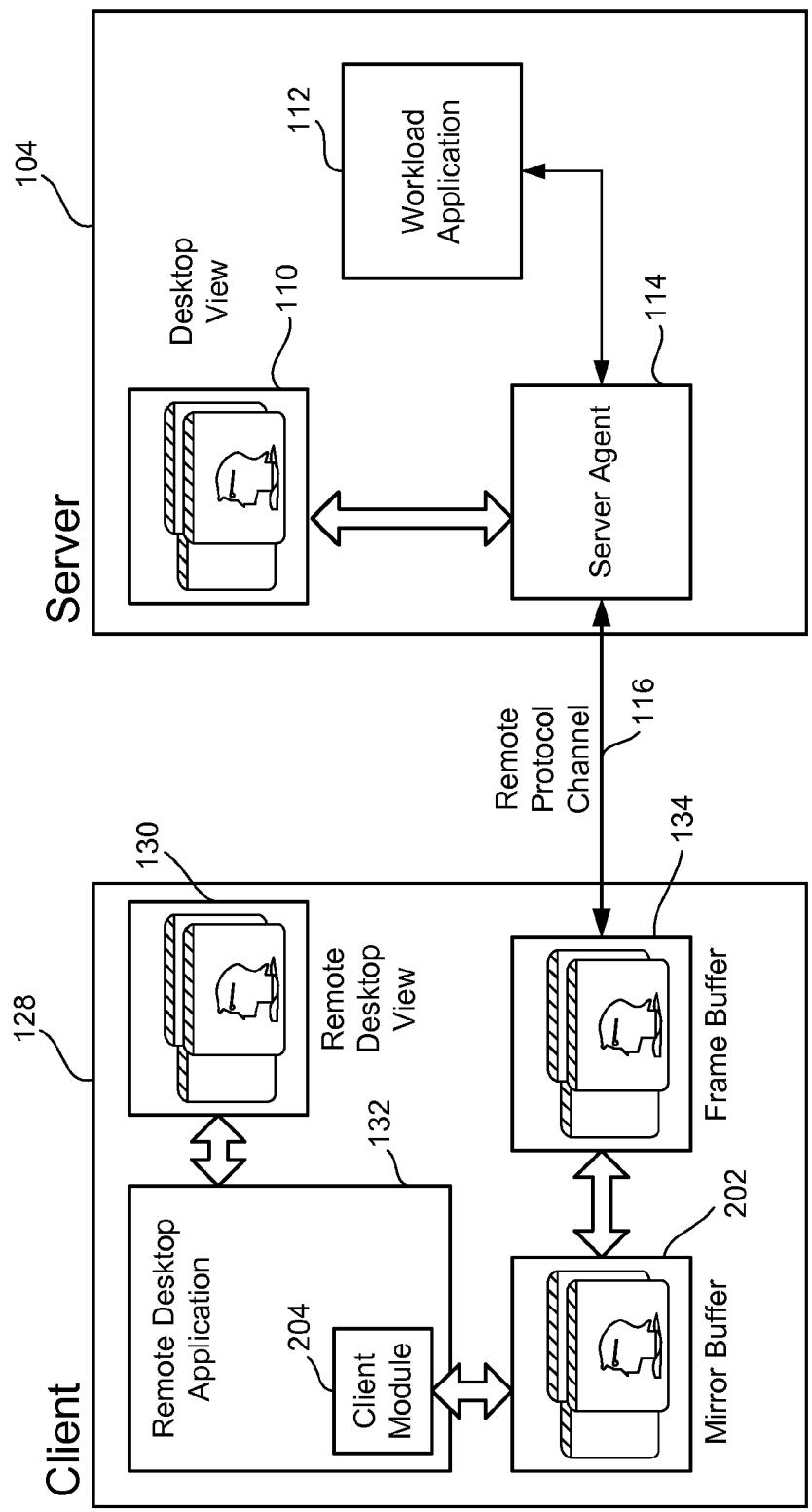
FIG. 2 shows an exemplary architecture for measuring display performance using information sent on the display channel and detected on a mirror buffer, in accordance with an embodiment of the invention.

FIG. 2 shows an architecture for measuring display performance using information sent on the display channel and detected on a mirror buffer, in accordance with one embodiment. Rather than using the data channel, server 104 notifies client 128 of particular events using a specific section of the screen. A specific area of the screen is designated to carry information in the form of encoded watermarks that correspond to predefined messages. Examples of encoded watermarks in accordance with embodiments of the invention are described in more detail below.

Initially, a user action, such as a mouse click or keyboard event, is detected at remote desktop application 132. The action is sent to server agent 114 via client module 204 and then forwarded to workload application 112. Workload application 112 processes the action received and sends the action to the appropriate module in the virtual machine that will process the action. As the action is processed, workload application 112 notifies server agent 114 and embeds encoded watermarks indicative of the processing status in the display view. Frame buffer 134 receives the updated display via remote protocol channel 116, and client module 204 scans for and detects the encoded watermarks. In one embodiment, the watermarks are embedded by overlaying, e.g., writing over, display data inserted into the frame buffer by the application or operating system.

Mirror buffer 202 holds a copy in memory of frame buffer 134 to lower the amount of processing required by client module 204 to scan for encoded pixels. Display mirroring technology is widely employed by remote desktop applications such as: NetMeeting, PC Anywhere, VNC, Webex, etc. Mirroring performs better than primitive screen grabbing, because mirroring allows the capture of only the minimally updated regions of the display and retrieves data directly, bypassing the intermediate copy. One example of a mirror buffer commercially available is DFMirage, a video driver mirroring technology for the Windows NT OS family. DFMirage is a driver for a virtual video device managed at the Display Driver Management Layer (DDML) level of the graphics system that exactly mirrors the drawing operations of one or more physical display devices. In another embodiment, client module 204 inspects frame buffer 134 directly without using a mirror buffer.

Figure 3:
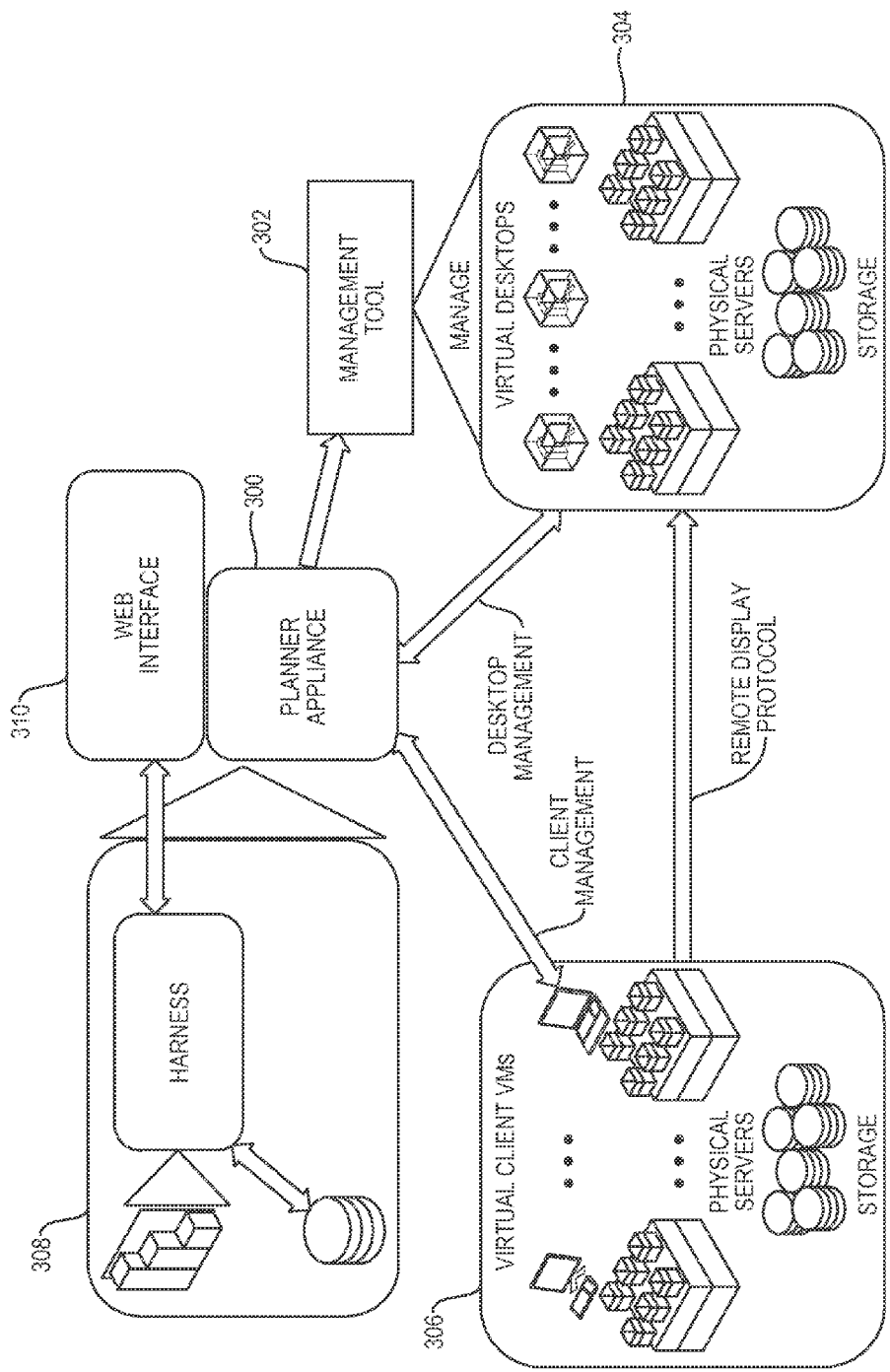
FIG. 3 is a high level schematic illustrating a system for performing workload simulations on virtual desktops, in accordance with an embodiment of the invention.

FIG. 3 is a high level schematic illustrating a system for performing workload simulations on virtual desktops, in accordance with an embodiment of the invention. A planner appliance 300 is provided which enables a user to configure a workload simulation to be carried out on a plurality of virtual desktops 304 and a plurality of corresponding virtual clients 306. Planner appliance 300 may be implemented as a virtual appliance, i.e., a virtual machine configured with a VDI planner application. It is also possible to implement planner appliance 300 as a traditional application running directly on a physical computer system and directly accessed by a user or as a software as a service (SaaS) or web service running in conjunction with a application server or web server. In one embodiment, the planner appliance 300 manages the virtual desktops by communicating with a management tool 302. Examples of management tools for controlling virtual desktops include VMware vCenter™ and VMware View™ available from VMware, Inc., and mentioned here by way of example and not by way of limitation.

In order to perform a simulation run, planner appliance 300 communicates with the virtual clients to initiate remote protocol connections to the virtual desktops. In one embodiment, the remote protocol connections are brokered by the management tool 302. In various embodiments, the remote protocol connections may utilize any suitable protocol for facilitating communication between virtual clients 306 and virtual desktops 304, such as Teradici's PC over IP (PCoIP) or Microsoft Remote Desktop Protocol (RDP). Planner appliance 300 starts the workload simulation on virtual desktops 304, and as the workload simulation progresses, event data is communicated to virtual clients 306 in the form of encoded watermarks, as described in further detail below. These watermarks are detected at the virtual clients 306, and upon completion of the run, results are provided to harness 308 that collects and stores the results, and makes the results available for analysis and review. A web interface 310 provides an easily accessible interface for controlling the planner appliance 300 and accessing the harness 308.

Figure 4:
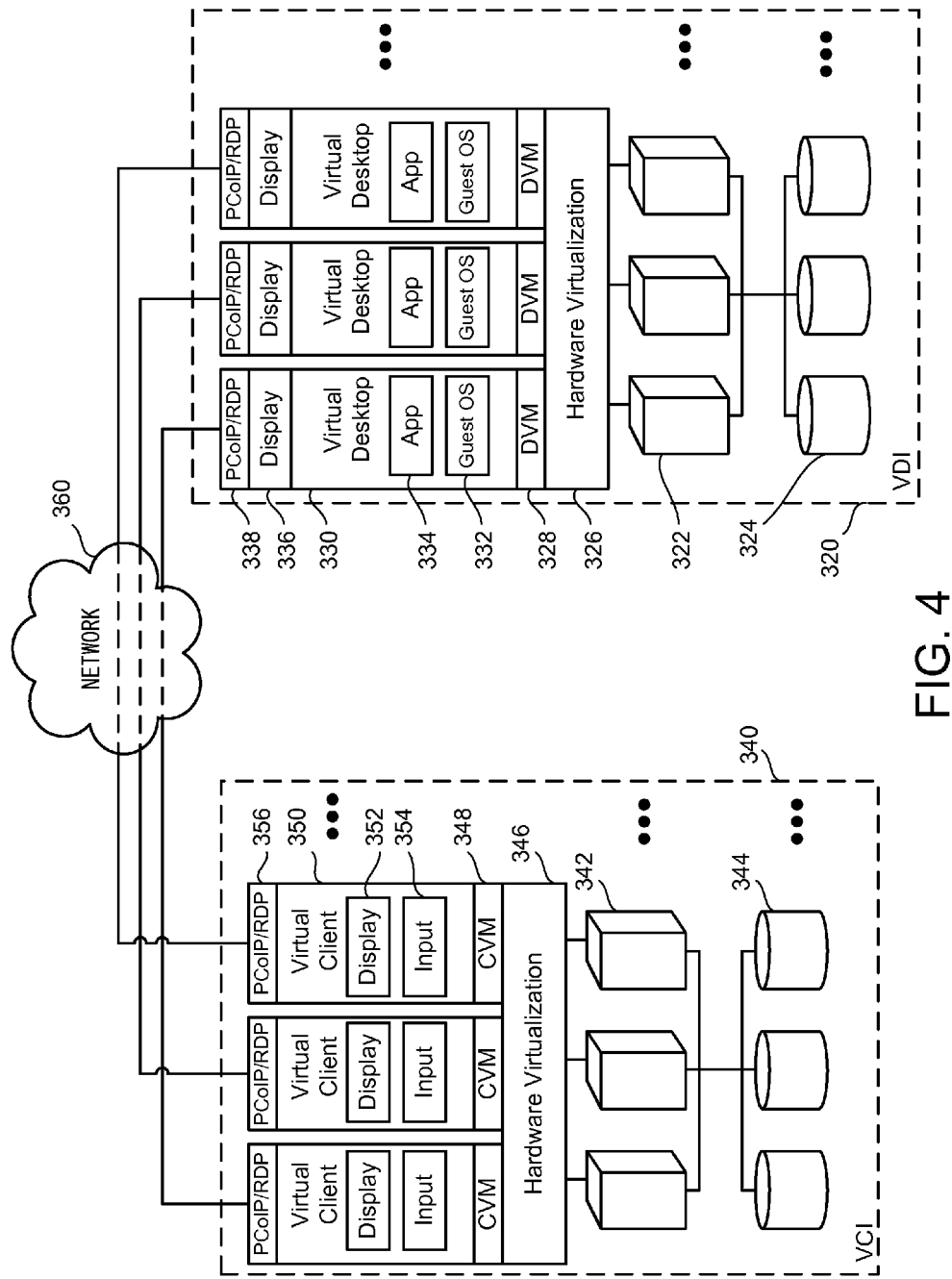
FIG. 4 illustrates a virtual desktop infrastructure and a virtual client infrastructure, in accordance with an embodiment of the invention.

FIG. 4 illustrates a virtual desktop infrastructure (VDI) and a virtual client infrastructure, in accordance with an embodiment of the invention. VDI 320 includes various computing resources, such as server computers 322 and storage 324. These computing resources are abstracted by a hardware virtualization module 326, which manages the actual utilization of the computing resources while presenting a unified interface which enables the provisioning of a plurality of desktop virtual machines 328 across the computing resources, independent of the individual server computers and storage which are managed by the hardware virtualization module 326. Each desktop virtual machine 328 supports a virtual desktop 330 that is defined by a guest OS 332 and one or more applications 334 which run on the guest OS 332. A display module 336 generates image data in the form of display updates which define a view of the virtual desktop. This image data is transmitted by a communications module 338 using a remote protocol such as PCoIP or RDP.

Virtual client infrastructure 340 includes various computing resources such as server computers 342 and storage 344, which are abstracted by a hardware virtualization module 346. A plurality of client virtual machines 348 are provisioned on the abstracted computing resources. Each client virtual machine supports a virtual client 350 that is configured to emulate the activity of a user using a typical thin client to access a corresponding virtual desktop. Thus, in the illustrated embodiment, virtual client 350 communicates via communications module 356 with its corresponding virtual desktop to receive display updates as well as send input commands. Virtual client 350 includes display handler 352 which receives the display updates from the virtual desktop, and also includes an input module for generating input data that is sent to the corresponding virtual desktop. Each virtual client machine 348 connects to a corresponding virtual desktop 334 over network 360, which can include any of various types of data networks such as a LAN, WAN, or the Internet.

Figure 5:
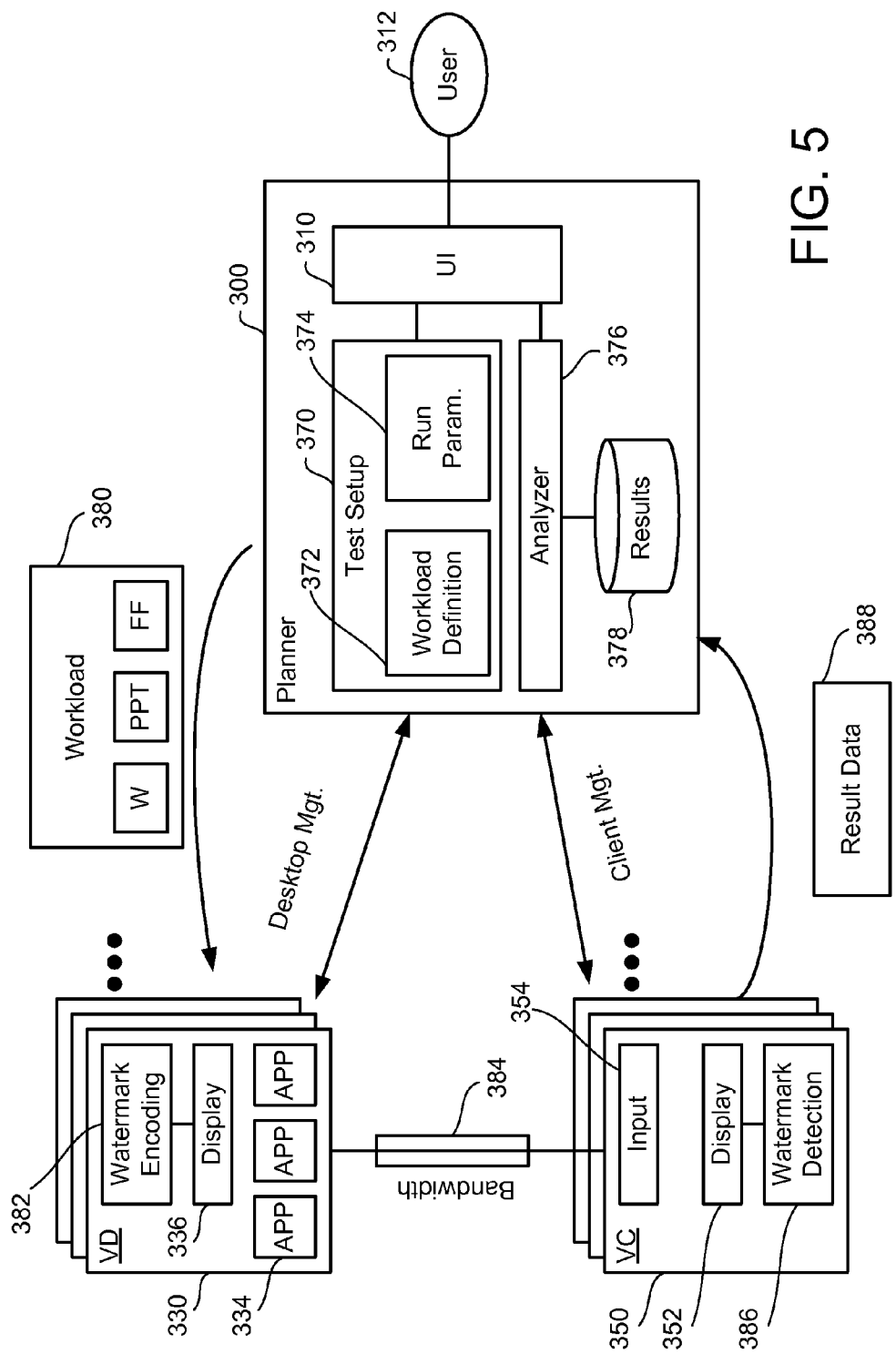
FIG. 5 illustrates a system for testing workload performance on virtual desktops, in accordance with an embodiment of the invention.

FIG. 5 illustrates a system for testing workload performance, in accordance with an embodiment of the invention. Planner appliance 300 includes a user interface 310 which enables user 312 to access and control planner appliance 300. Planner appliance 300 includes test setup module 370 for enabling the user to define the specifics of the test to be performed. In particular, a workload definition module 372 enables the user to define a specific workload to be performed by the virtual desktops 330, and run parameter module 374 enables the user to define various run parameters. Workload 380 defines specific activities which are to be executed by the virtual desktops, such as automated opening and closing applications 334 and performing various actions within the applications. The run parameters generally define the structural setup of the testing system, such as the number of virtual desktops and virtual clients to be provisioned and their characteristics, as well as additional parameters relating to the actual performance of the workload, such as the number of times the workload will be iterated at each virtual desktop.

When the user activates the planner appliance 300 to initiate the test, it proceeds to execute workload 380 on each of the virtual desktops 330. As workload 380 is executed, each virtual desktop 330 sends image data to a corresponding virtual client 350. Virtual desktop 330 includes watermark encoding module 382 that encodes watermarks in the image data which are indicative of a status of processing of the workload. As described in further detail below, such watermarks can encode information such as a particular application, an action within the application, and the initiation or completion of the action. As the image data is received by virtual client 350, a watermark detection module detects the encoded watermarks within the image data, and records timestamps indicating when the watermarks are received. The encoded data and the timestamps are collected, and when the workload run in completed, result data 388 is uploaded to results storage 378. The result data can then be analyzed by analyzer 376, and the user can evaluate the results of the test.

Figure 6A:
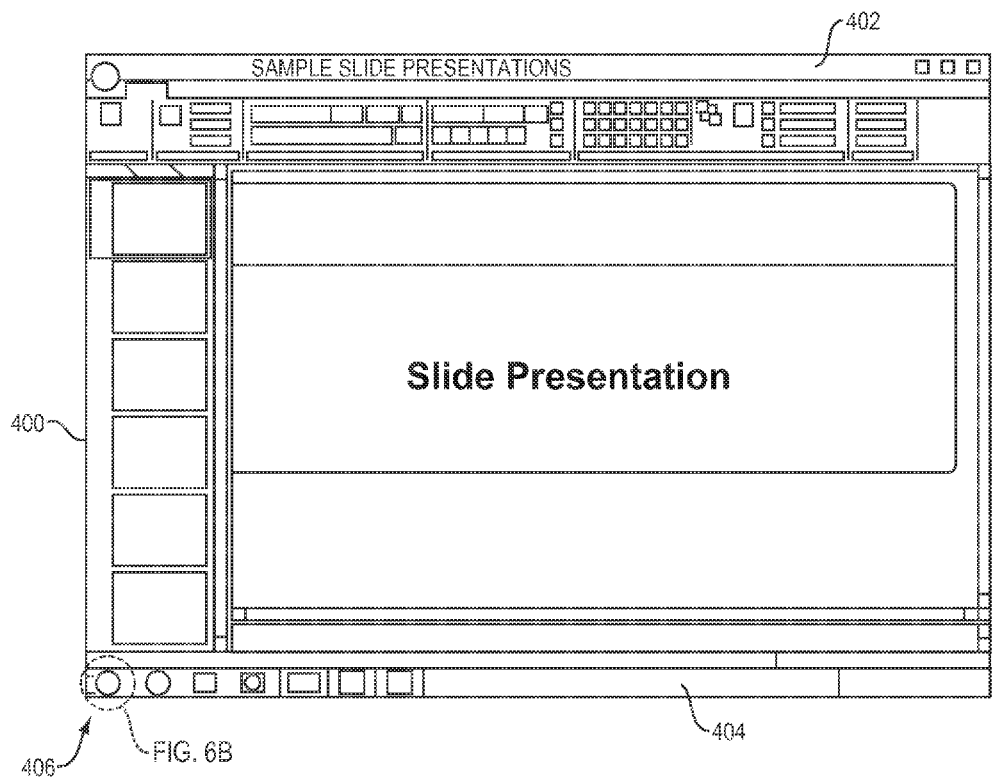
FIGS. 6A and 6B illustrate a screenshot of a virtual desktop, in accordance with an embodiment of the invention.
Figure 6B:
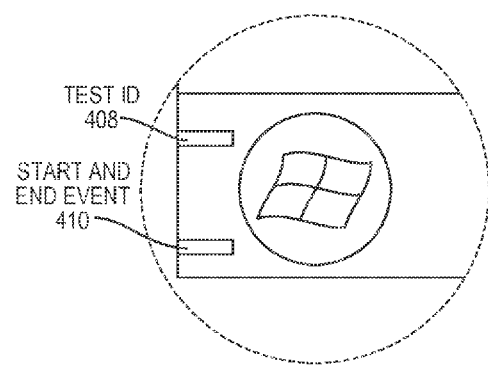

FIGS. 6A and 6B illustrate a screenshot of a virtual desktop, in accordance with an embodiment of the invention. In the illustrated embodiment, the virtual desktop 400 is a Windows 7 desktop environment, provided by way of example and not by way of limitation. It will be understood by those skilled in the art that in other embodiments, any of various other operating systems which provide a desktop environment for performing computing tasks may be utilized to provide the virtual desktop. As shown, an application window 402 is open for viewing on the virtual desktop 400. The virtual desktop 400 includes a taskbar 404, which is configured to be constantly displayed. Taskbar 404 includes a start menu button 406 for accessing the start menu of the virtual desktop.

As noted, an encoded watermark is embedded in the image data which transmits the view of the virtual desktop to the client. If the location of the encoded watermark is placed in an application workspace, then the encoded watermark could be hidden by an overlapping application. Additionally, it is desirable for the encoded watermark to be presented in an unobtrusive manner so as not to interfere with applications and other functionality of the virtual desktop. Therefore, in the illustrated embodiment, the encoded watermark is positioned on the start menu button 406. The start menu button 406 is configured so as to be constantly displayed, and is located in a corner region of the virtual desktop 400, so that watermarks presented therein will be unobtrusive to the user. The encoded watermark is defined by a portion 408 which defines a test identification value, and a portion 410 which defines a start event code and an end event code, as described in further detail below.

Figure 7:
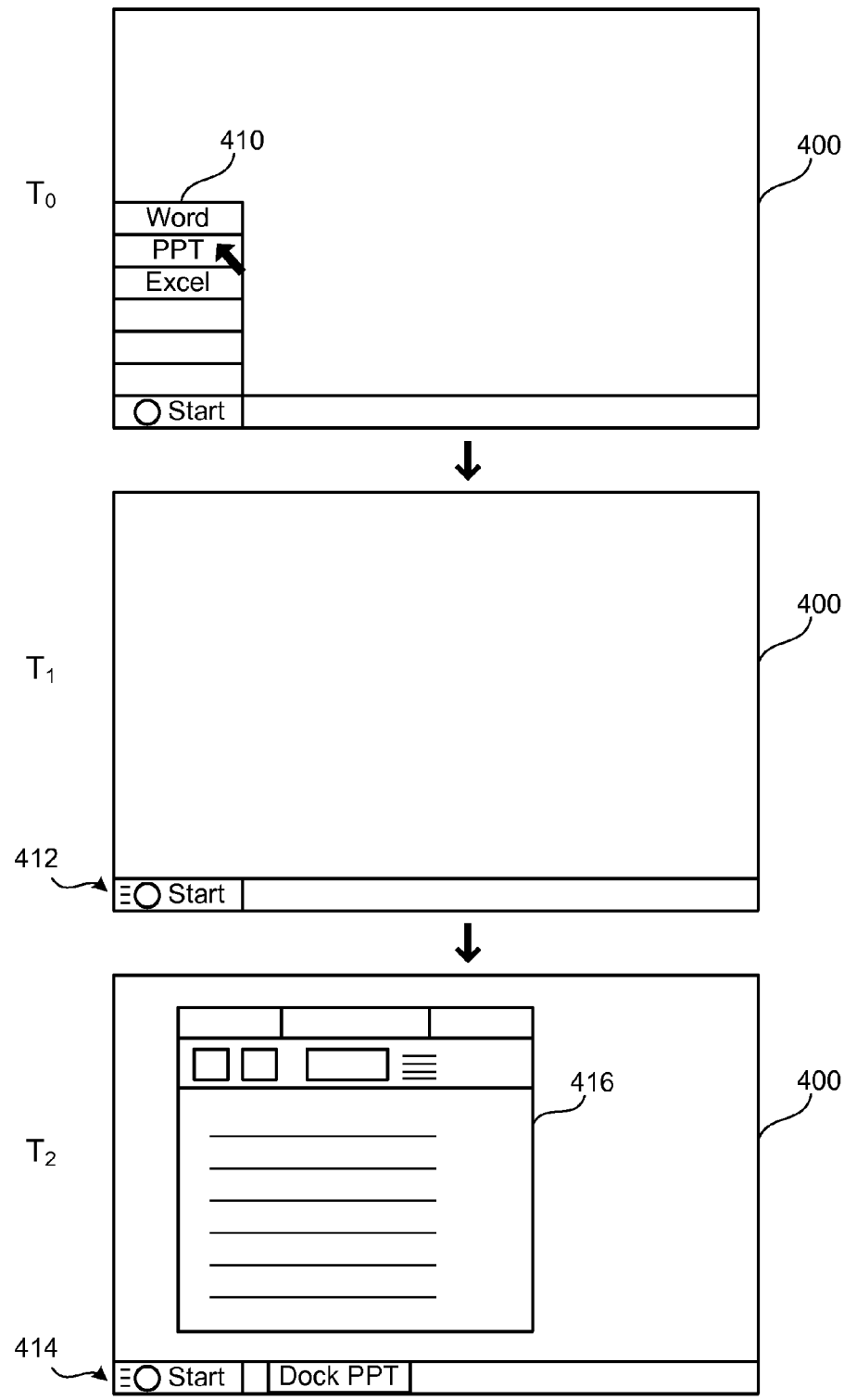
FIG. 7 illustrates a progression of views of a virtual desktop as an application is opened, in accordance with an embodiment of the invention.

FIG. 7 illustrates a progression of views of a virtual desktop as an application is opened, in accordance with an embodiment of the invention. At time T0, a selection is made at the client to open an application from the start menu 410 shown on the virtual desktop 400. At time T1, the view of the virtual desktop is updated to display an encoded watermark 412 corresponding to initiation of the opening of the application at the server. At time T2, the watermark 414 is provided which indicates completion of the opening of the application. As shown, a window 416 for the opened application is now displayed on the virtual desktop 400.

Figure 8A:
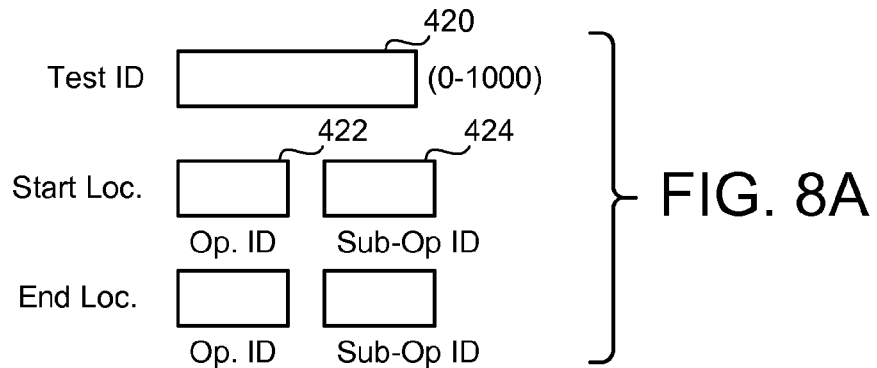
FIG. 8A illustrates values defined by an encoded watermark, in accordance with an embodiment of the invention.

FIG. 8A illustrates values defined by an encoded watermark, in accordance with an embodiment of the invention. As shown, the watermark defines a test ID, a start location, and an end location, each of which is defined at a specific location within the watermark. For a given workload, each operation in the workload is assigned an event code which defines an operation ID corresponding to a specific application and a sub-operation ID corresponding to a sub-operation pertaining to that application. Thus, unique numbers are assigned to each of the applications and the sub-operations associated with the applications. For example, Table I shown below illustrates one such assignment, in accordance with one embodiment of the invention.

TABLE I

| Operation Id | Application | Sub-operations (ID) |
|---|---|---|
| 1 | Firefox | ["Open"(1), "Close"(2)] |
| 2 | Excel_Sort | ["Open"(1), "Compute"(2), "Save"(3), "Close"(4), "Minimize"(5), "Maximize"(6), "Entry"(7)] |
| 3 | Word | ["Open"(1), "Modify"(2), "Save"(3), "Close"(4), "Minimize"(5), "Maximize"(6)] |
| 4 | AdobeReader | ["Open"(1), "Browse"(2), "Close"(3), "Minimize"(4), "Maximize"(5)] |
| 5 | IE_ApacheDoc | ["Open"(1), "Browse"(2), "Close"(3)] |
| 6 | PPTx | ["Open"(1), "RunSlideShow"(2), "ModifySlides"(3), "AppendSlides"(4), "SaveAs"(5), "Close"(6), "Minimize"(7), "Maximize"(8)] |
| 7 | Outlook | ["Open"(1), "Read"(2), "Restore"(3), "Close"(4), "Minimize"(5), "Maximize"(6), "Attachment-Save"(7)] |
| 8 | 7zip | ["Compress"(1)] |
| 9 | Excel_Formula | ["Open"(1), "Compute"(2), "Save"(3), "Close"(4)] |
| 10 | Video | ["Open"(1), "Play"(2), "Close"(3)] |
| 11 | Eclipse | ["Open"(1), "ImportProject"(2), "Build"(3), "DeleteProject"(4), "Close"(5)] |
| 12 | IE_WebAlbum | ["Open"(1), "Browse"(2), "Close"(3)] |

With continued reference to FIG. 8A, there is shown an event code having an operation ID 422 and a sub-operation ID 424. When a given operation is initiated, the watermark is encoded to show the event code at the start location, while no values are presented at the end location. Then, when the given operation is completed, the watermark is encoded to show the event code at the end location. When the client detects the event code at the start location, it records a timestamp indicating the initiation of the operation. And when the client detects the event code at the end location, it records a second timestamp indicating the completion of the operation. Thus, the client is able to identify the operation being performed as well as the response time for the operation, which is the difference between the start and end timestamps.

Due to issues arising from the use of lossy compression when transmitting display updates from the server to the client, detection of the event code at the start and end locations of the watermark at the client can be problematic. Therefore, an additional test ID is provided to make the watermark detection more robust. A test ID 420 is a unique number that is assigned to each watermark, and therefore corresponds to either a start or an end of a given operation. Incorporation of the test ID in the watermarking means that performance of a given operation will result in generation of a first watermark consisting of a first test ID and an event code in the start location (which indicates initiation of the operation), and a second watermark consisting of a second test ID and the event code in the end location (which indicates completion of the operation).

In one embodiment, the test IDs are arranged in corresponding pairs which enable them to be matched to each other when they are detected at the client. Each corresponding pair is assigned to a given operation and thus provides added robustness in determining accurate start and end times for the operation. In one embodiment, the corresponding pairs are configured so that the total value of each pair is a predefined sum. For example, if the predefined sum is N, then for a given operation x, the watermark indicating initiation of the operation has a test ID=x (and an event code positioned at the start code location), and the watermark indicating completion of the operation has a test ID=N−x (and the event code positioned at the end code location). Thus when the test IDs and the event codes at the start and end locations are detected in two different watermarks, the test IDs can be summed to ensure that their sum matches the predefined value, thus providing for accurate determination of the start and end of an operation based on the corresponding watermarks, even under lossy compression.

In some embodiments, the value of the predefined sum N is configured to be relatively large as compared to the value of x. In this manner, the test IDs x and N−x will not look similar to each other when encoded in their corresponding watermarks.

Figure 8B:
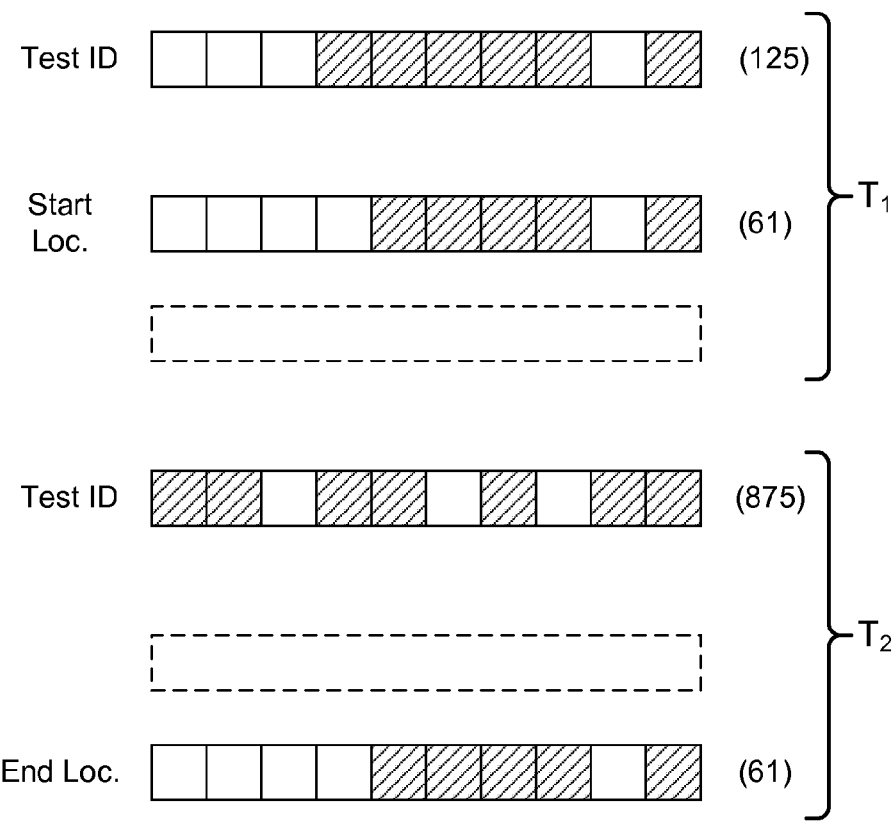
FIG. 8B illustrates encoded watermarks for an operation, in accordance with an embodiment of the invention.

FIG. 8B illustrates encoded watermarks for an operation, in accordance with an embodiment of the invention. In one embodiment, each value (test ID or event code) in a given watermark is encoded as a bar of binary encoded pixels. In other words, each pixel of the bar represents one digit of a binary number, so that each pixel displays a binary state of 0 or 1. The binary encoded pixels may thus be configured to display one of two different colors at each pixel location depending on whether the given pixel is intended to represent a 0 or 1. For example, in one embodiment wherein the color of each pixel is defined by RGB values that range from 0 to 255, then a pixel having RGB values of (0, 0, 0) could correspond to a binary value of 0 whereas a pixel having RGB values of (255, 255, 255) could correspond to a binary value of 1. By correlating the binary values to the extremes of the RGB value range, there is high contrast between the binary states of the pixels, and thus the binary values encoded by the pixels can be more accurately determined.

Figure 8C:
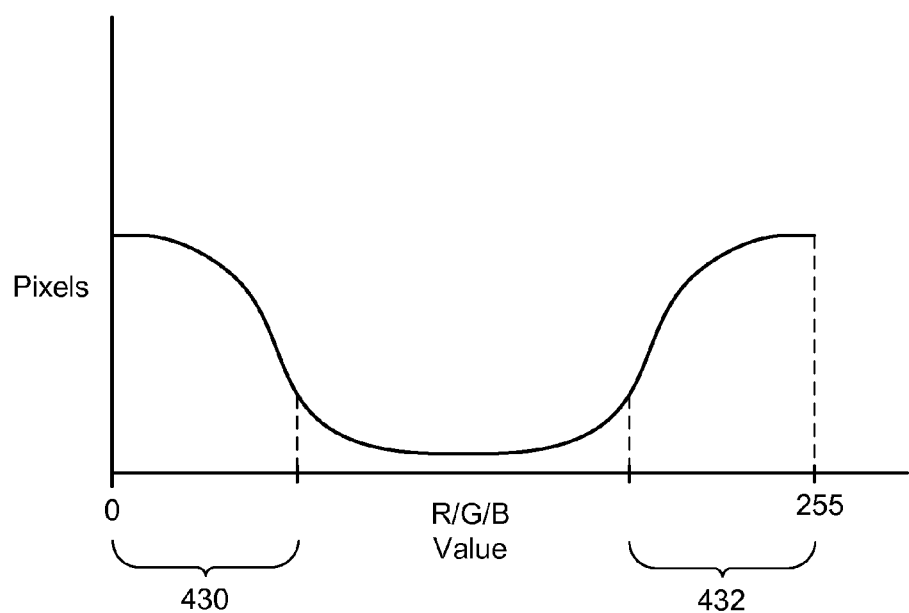
FIG. 8C is a graph illustrating the distribution of binary encoded pixels in a watermark according to their RGB values as received by the client, in accordance with an embodiment of the invention.

FIG. 8C is a graph illustrating the distribution of binary encoded pixels in a watermark according to their RGB values as received by the client, in accordance with an embodiment of the invention. These pixels were all originally binary encoded with RGB values of either (0, 0, 0) or (255, 255, 255). However, due to the use of lossy image compression in the transmission of updates to the view of the virtual desktop, the received values of these pixels at the client includes RGB values other than (0, 0, 0) and (255, 255, 255). The result is a distribution of RGB values as shown, where the majority of the values are near the extremes of the RGB value range. Thus, in one embodiment, detection of the RGB values in the region 430 can be interpreted as the binary value 0 while detection of the RGB values the region 432 can be interpreted as the binary value 1. It should be appreciated that the illustrated graph is not drawn to scale, but provided by way of example to conceptually illustrate the detection of binary values based on RGB values in binary encoded pixels that are not perfectly binary when received at the client.

Figure 9A:
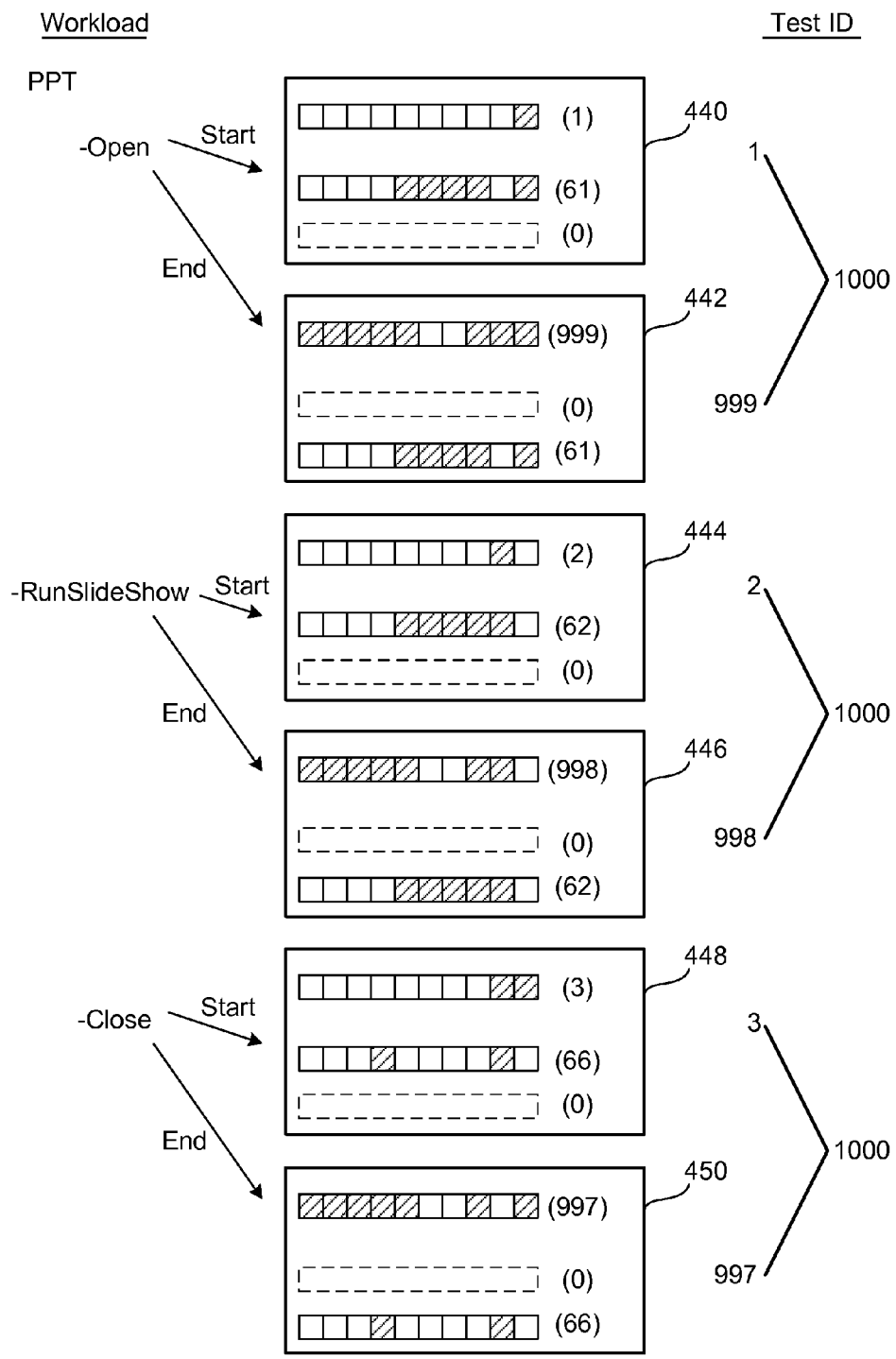
FIGS. 9A and 9B illustrate an example workload and corresponding watermarks and test IDs, in accordance with an embodiment of the invention.
Figure 9B:
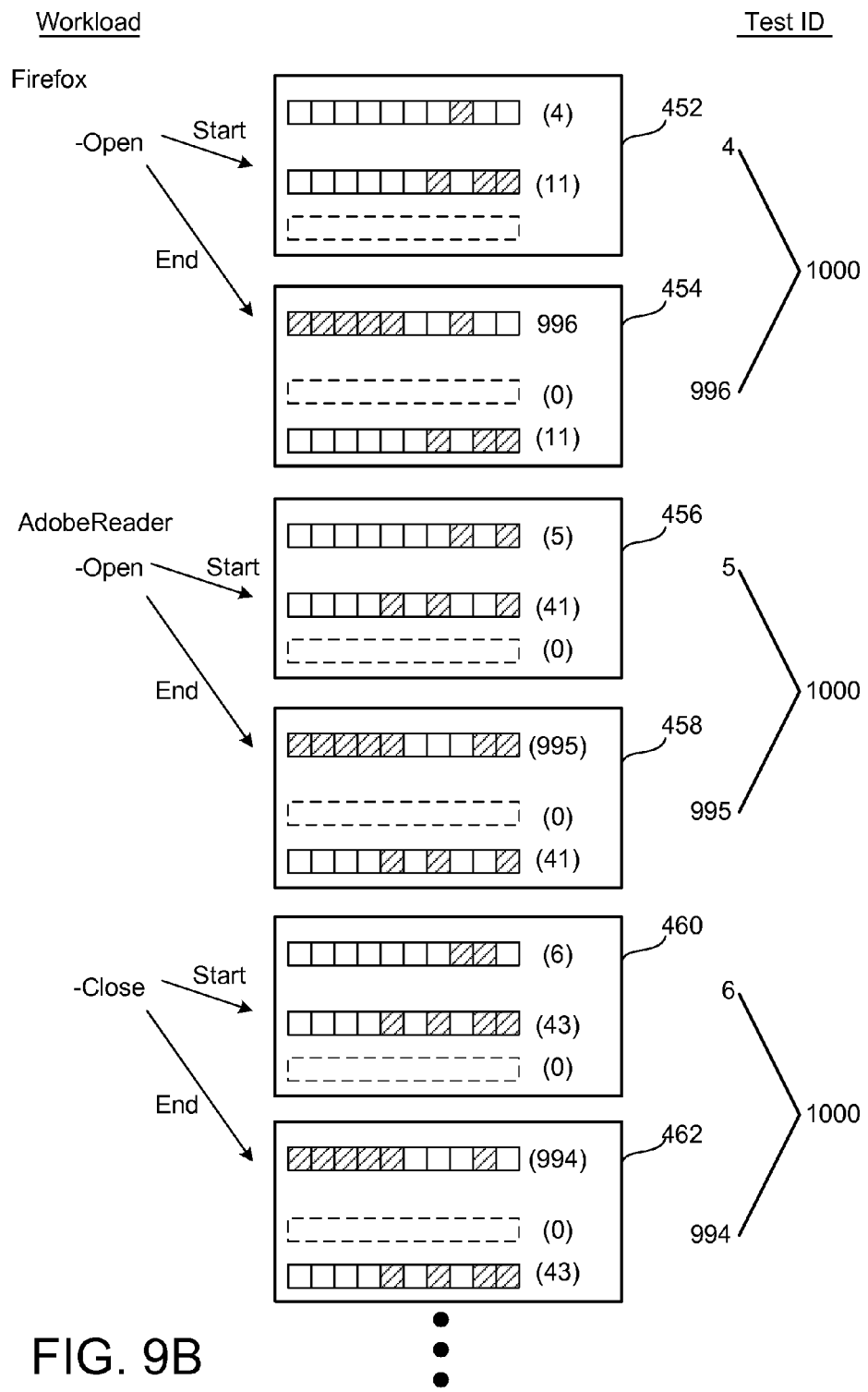

FIGS. 9A and 9B illustrate an example workload and corresponding watermarks and test IDs, in accordance with an embodiment of the invention. The workload initiates with an example PowerPoint open operation that has an event code 61, in accordance with Table I shown above. The initiation of the PowerPoint open operation is assigned a test ID of 1. Thus, the initiation of the PowerPoint open operation triggers the sending of watermark 400 from the server to the client. The watermark 400 includes binary encoded pixels indicating the test ID is 1, and the event code is 61 at the start location within the watermark. In the illustrated embodiment, the test IDs are assigned in pairs which sum to 1000. Therefore the end of the PowerPoint open operation is assigned a test ID of 999. The watermark indicating the end of the PowerPoint open operation thus includes binary encoded pixels indicating the test ID of 999, and the event code as 61 in the end location of the watermark.

An example PowerPoint RunSlideShow operation has an event code 62. The start of the operation is assigned a test ID of 2, while the end of the operation is assigned a test ID of 998. Thus, the start watermark 444 includes binary encoded pixels indicating the test ID as 2, and the event code as 62 in the start location of the watermark. The end watermark 446 includes binary encoded pixels indicating the test ID as 998, and the event code as 62 in the end location of the watermark.

An example PowerPoint close operation has an event code 66. The start of the operation is assigned a test ID of 3, while the end of the operation is assigned a test ID of 997. Thus, the start watermark 448 includes binary encoded pixels indicating the test ID as 3, and the event code as 66 in the start location of the watermark. The end watermark 450 includes binary encoded pixels indicating the test ID as 997, and the event code as 66 in the end location of the watermark.

Referring now to FIG. 9B, an example Firefox open operation has an event code 11. The start of the operation is assigned a test ID of 4, while the end of the operation is assigned a test ID of 996. Thus, the start watermark 452 includes binary encoded pixels indicating the test ID as 4, and the event code as 11 in the start location of the watermark. The end watermark 454 includes binary encoded pixels indicating the test ID as 996, and the event code as 11 in the end location of the watermark.

An example AdobeReader open operation has an event code 41. The start of the operation is assigned a test ID of 5, while the end of the operation is assigned a test ID of 995. Thus, the start watermark 456 includes binary encoded pixels indicating the test ID as 5, and the event code as 41 in the start location of the watermark. The end watermark 458 includes binary encoded pixels indicating the test ID as 995, and the event code as 41 in the end location of the watermark.

An example AdobeReader close operation has an event code 43. The start of the operation is assigned a test ID of 6, while the end of the operation is assigned a test ID of 994. Thus, the start watermark 460 includes binary encoded pixels indicating the test ID as 6, and the event code as 43 in the start location of the watermark. The end watermark 462 includes binary encoded pixels indicating the test ID as 994, and the event code as 43 in the end location of the watermark.

The presently described workload is provided merely by way of example only, and not by way of limitation. It will be appreciated by those skilled in the art that the workload can include any number of applications, and may define any number of sub-operations within each application. Furthermore, sub-operations pertaining to a given application can be repeated multiple times in any particular ordering so as to simulate the activity of a typical user. Additionally, it is noted that in one embodiment, the operations of the workload can be organized according to application and sub-operations for each application. In one embodiment, the execution of the workload proceeds in such a manner that the applications of the workload are executed in a random non-repeating order, however, the sub-operations defined for each application are executed sequentially. In this manner, each of the virtual desktop machines executes all of the same applications as defined by the workload, but in an order that is at random, so as to provide a mixture of process ordering across the group of virtual desktops which are being tested.

As noted above, the watermark can be maintained in the vicinity of a start menu button. However, when there is a change in screen resolution, then the location of the start menu button will change, so it is necessary to determine the screen resolution automatically at the client and adjust the virtual desktop and the watermark encoding accordingly. In one embodiment, the location of the various lines of the watermark are indicated as follows: location_y=m*screen_height+n; location_x=0; where m=1.0 and n=−28, −6, and −3 for test_id, start line, and end line, respectively.

In accordance with another embodiment, it is noted that the location of the start menu button can be configured to placed at different locations on the virtual desktop. Therefore, in one embodiment, the location of the start menu button is automatically detected at the client. Subsequent watermarks in the display updates are then configured to provide the watermark at the location of the start menu button.

In one embodiment, a VDI plug-in runs a state machine on the client side, changing state from sending an event for the next operation of the workload, to waiting for the start of the event, to waiting for the end of the event, to finally waiting for the think time. In one embodiment, in the sending event state the VDI plug-in sends a simple key event (e.g. ctrl-shift) to signal the desktop to start the next operation. Then the VDI plug-in records the times when the start and end of the event are detected based on watermarking as described above. The VDI plug-in continues to iterate through different states of the state machine until the workload finish event is sent.

In one embodiment, there is a separate video plug-in for video watermark detection. Therefore, during a video play operation, the video plug-in is activated to enable recording of frame timings based on watermark detection within the video. After the video playback is completed, then the video plug-in is deactivated, and the VDI plug-in continues its operation.

Figure 10:
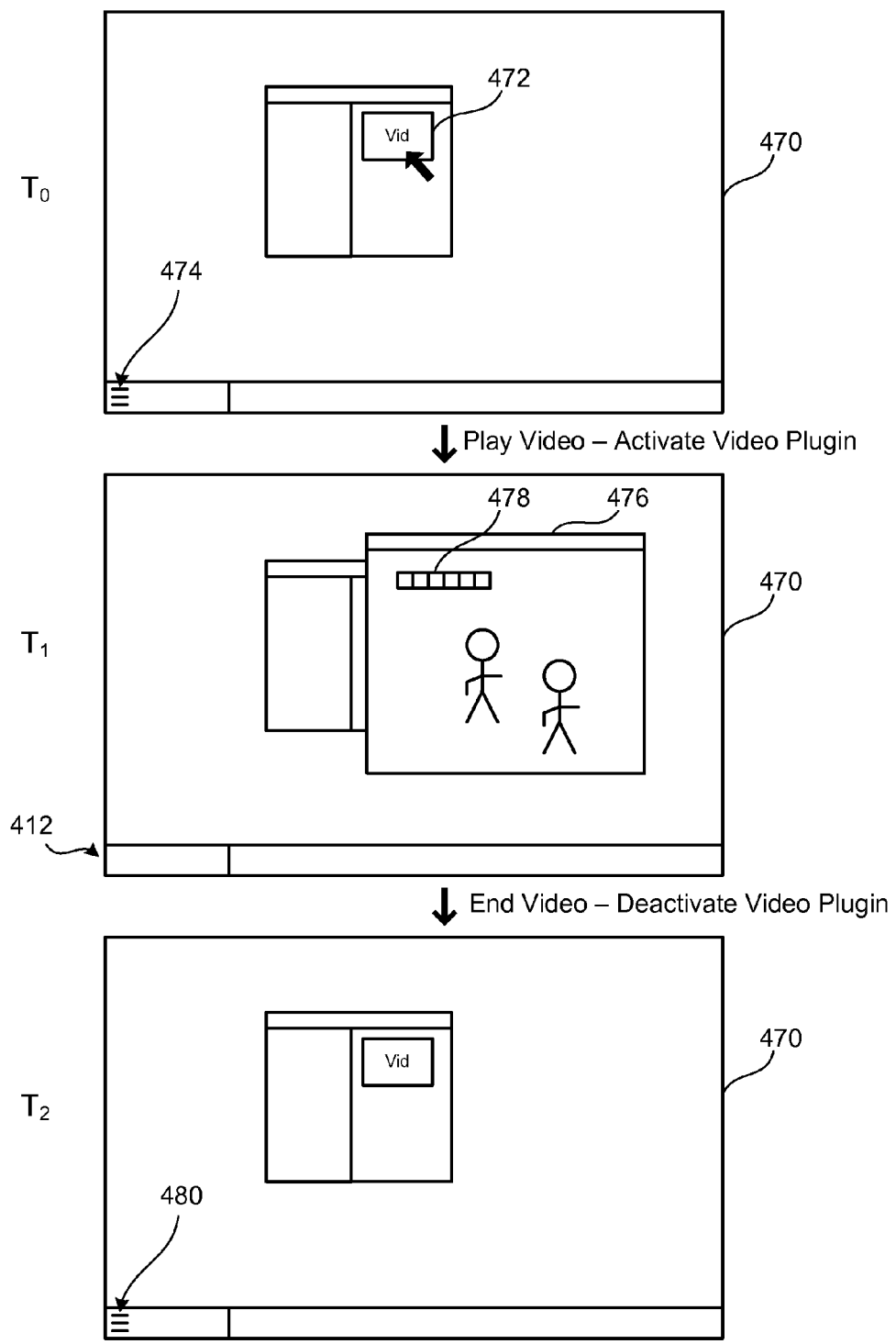
FIG. 10 illustrates activation of a video plug-in, in accordance with an embodiment of the invention.

FIG. 10 illustrates activation of a video plug-in, in accordance with an embodiment of the invention. At time $T_0$, a video playback operation of a video file 472 is initiated on a virtual desktop 470. The initiation of the video playback operation coincides with the rendering of a watermark 474 indicating the initiation of the playback operation. At time $T_1$, a video playback window 476 has appeared on the virtual desktop 470. The video file 472 is pre-encoded to include a watermark that is displayed when the video is played. This watermark can be configured to indicate the frame timings of the video, as well as other information about the video file. When the start of a video playback operation is detected at the client, a video plug-in is activated on the client to enable detection of the video watermark 478. When playback of the video is completed at time T2, a corresponding end watermark 480 is displayed on the virtual desktop 470. The detection of the end watermark 480 triggers deactivation of the video plug-in at the client.

In accordance with another embodiment, it is noted that in extreme WAN conditions, there can be packet/display reordering which may cause the aforementioned techniques for detecting operation events to fail. Therefore, in one embodiment, a few select points are marked with a predefined color. As the application renders on top of these selected points, the marked color disappears from the desktop view. Thus, the client is able to monitor the color of the selected points and detect the start and end of an operation by detecting the change in color as the application renders on top of the selected points.

Figure 11:
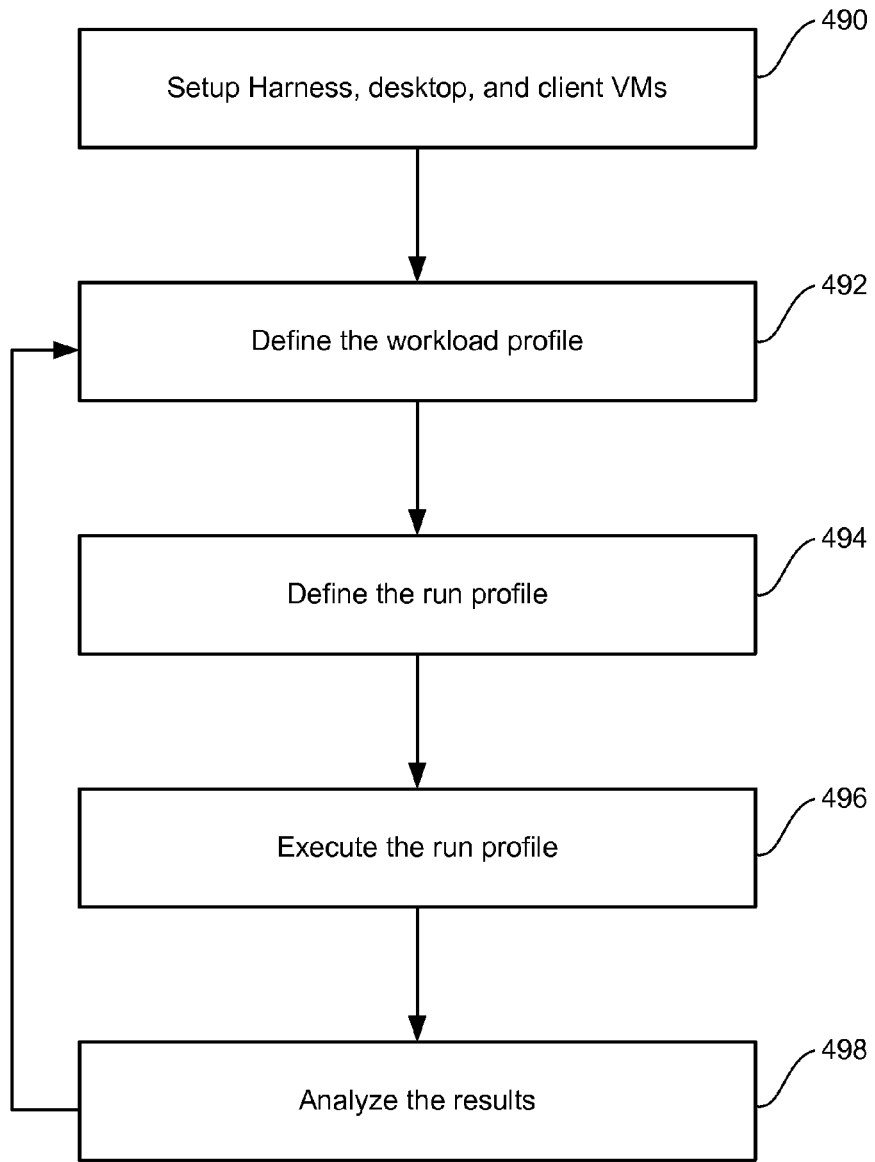
FIG. 11 illustrates a method for testing a virtual desktop infrastructure, in accordance with an embodiment of the invention.

FIG. 11 illustrates a method for testing a virtual desktop infrastructure, in accordance with an embodiment of the invention. At operation 490, the desktop virtual machines and client virtual machines are provisioned. Also, a harness is set up for collecting data from the test. At operation 492, a workload profile is defined. The workload profile defines a series of operations to be performed on the desktop virtual machines.

At operation 494, a run profile is defined. The run profile specifies the parameters of a given test run. For example, a run profile may be configured to define one or more workload profiles to be iterated, the number of times a workload profile is to be iterated, the length of a pause between operations defined in the workload profile, etc.

At operation 496, the run profile is executed, causing at least one workload profile to be executed on the desktop virtual machines. After execution of the run profile is complete, the results of the test are collected by the harness and stored for review. At operation 498, the results are analyzed, and based on the analysis, a user can determine whether to perform another run utilizing a different workload profile or run profile.

Virtualized environments make effective use of hardware by allowing multiple operating system instances to run simultaneously on a single computer. However, poorly designed virtual environments can cause unpredictability in the way applications behave, primarily due to resource over commitment. Operation of the planner appliance as described herein enables one to detect limitations of particular virtual desktop infrastructure implementations. However, the planner appliance workload includes another application (the server agent) running inside virtual desktops, and is therefore susceptible to the same unpredictability and failures under load. Therefore, to make the process of timing measurement and reporting more reliable, various mechanisms can be incorporated to ensure that the workload runs to completion even under stressful conditions.

In one embodiment, the operations of a workload are configured to be idempotent, so that if they fail, they can be retried without disturbing the flow of operations. It has been discovered that often operations fail because of transient load errors and will most likely succeed if tried again. Therefore, in one embodiment, if an operation fails, it is retried a specified number of times before declaring an actual failure. In one embodiment, the operation is retried three times before declaring a real failure. In other embodiments, the number of retries may be arbitrarily configured within the workload profile, or may be dependent upon the type of operation being performed. For example, operations which are less resource intensive may be retried a greater number of times than operations which are more resource intensive. By implementing a retry mechanism when operations initially fail, the overall success rate of individual operations passing under high load can be improved.

However, some operations may still fail even after multiple retries. Therefore, in one embodiment, when such occurs the entire workload is failed. However, this precludes the successful measurement data that could otherwise be obtained from the workload. Therefore, in another embodiment, when an operation fails even after its preset number of retries, then any further operations of the application that encountered the failure are ignored, and the remainder of the workload is permitted to proceed. By selectively pruning failed applications from those desktop virtual machines in which they occur, failures may be handled at a granular level and the number of successful test measurements which can be applied towards the final results are maximized.

In another embodiment, a progress checker process is implemented to ensure that the workload is progressing smoothly. The progress checker process is a simple user level process that has an extremely low chance of failing. In one embodiment, a progress file is created to keep track of workload progress by storing the number of operations completed. When the workload starts, it initializes the progress file and launches the progress checker process. As the workload progresses through its operations, it increments a count in the progress file. The progress checker process periodically wakes up and reads from the progress file. The progress checker terminates the workload if it detects no progress. In order to ensure that the workload is not accidentally terminated, the time period that the progress checker sleeps is set to be substantially longer than the expected time taken by the longest running operation in the workload. For example, in one embodiment, the progress checker is set to sleep for three times the expected time of the longest running operation. Additionally, if the progress checker terminates the workload, then it also reports the collected timing measurements performed thus far by the workload.

Embodiments of the present invention have generally been described with reference to systems including a planner appliance which facilitates definition of workloads, provisioning of virtual clients and corresponding virtual desktop systems, and execution of simulation runs and subsequent collection of result data. However, it should be appreciated that the principles of the invention described herein are equally applicable to conventional virtual desktop systems, typically including a plurality of thin client machines each of which connects to a virtual desktop. For example, the aforementioned techniques for watermarking can be utilized in such environments to measure actual response times for operations carried out on virtual desktop systems in a real deployment, thereby providing guidance as to how to fine tune the operation of such systems. In such systems, a given virtual desktop's workload is not predefined, but is instead generated in real-time as it receives action requests from its corresponding client. Result data consisting of action performance times, which are the time differences between detection at the client of start watermarks and corresponding end watermarks for various operations, can be stored at the client or at the server, or in an external location, for subsequent review and analysis.

Additionally, it should be noted that the exemplary system architectures provided herein are shown by way of example only and not by way of limitation. In other embodiments, the specific arrangement of modules and components can be defined in alternative fashions without altering the overall functionality of the systems as described. Though each such configuration is not described herein for the sake of brevity, it should be apparent to those skilled in the art upon close reading of the present disclosure that such embodiments are within the spirit and scope of the presently described invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Although virtualization operations can take on many forms, several concepts are important to ensure that physical constructs of physical machines are properly transferred to virtual machines. With this in mind, and by way of reference, more information on virtual system and methods can be found in U.S. Pat. Nos. 6,397,242, 6,496,847, 7,069,413, 7,356,679, and US Published Application 2008/0244028 A1. Generally, virtualization systems in accordance with the various embodiments described herein, implemented as paravirtualized or non-paravirtualized hosted embodiments, non-hosted embodiments or as embodiments that tend to blur distinctions between the above, are all envisioned. Furthermore, various virtualization operations may be wholly or partially implemented in hardware.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for measuring performance of virtual desktop services offered by a server including a processor, the method comprising:

overlaying at the server a first encoded watermark onto a user interface display that is communicated to a client when initiating an operation, the first encoded watermark including a distinct first location, a second location, and a third location, wherein the first location, second location, and third location are defined as specific locations within the first encoded watermark, and wherein the first location includes pixels encoding an identification of the first encoded watermark and the second location includes pixels encoding a first identification value corresponding to an application executing on the virtual desktop and a start time of an operation within the application;

overlaying at the server a second encoded watermark onto the user interface display upon completion of the operation, the second encoded watermark including the first location, the second location, and the third location, wherein the first location includes pixels encoding an identification of the second encoded watermark and the third location includes pixels encoding a second identification value corresponding to an end time of the operation for the application; and storing in memory an operation performance time, the operation performance time being a time difference between detection at the client of the first encoded watermark and detection at the client of the second encoded watermark.

2. The method of claim 1, wherein:
the second location of the first encoded watermark further includes a first operation identifier and a first sub-operation identifier for the application; and
the third location of the second encoded watermark further includes a second operation identifier and a second sub-operation identifier for the application.

3. The method of claim 1, wherein the first encoded watermark and the second encoded watermark are defined in a region of the virtual desktop that is constantly displayed in the virtual desktop.

4. The method of claim 1, further comprising:
determining a screen resolution of the client;
determining a location of the first and second encoded watermarks on the virtual desktop based on the determined screen resolution of the client.

5. The method of claim 1, wherein the operation is a video playback operation, the detection of the first encoded watermark at the client triggering activation of a video plug-in at the client for detecting encoded information in the video, and the detection of the second encoded watermark at the client triggering deactivation of the video plug-in.

6. The method of claim 1, further including storing in the memory action performance times from a plurality of clients.

7. The method of claim 6, further including, generating statistical performance metrics based on the stored action performance times.

8. The method of claim 1, wherein each of the first and second encoded watermarks comprise plurality of binary encoded pixels.

9. The method of claim 8, wherein the binary encoded pixels of the first encoded watermark and the second encoded watermark each include a first set of binary encoded pixels for the respective identification value and a second set of binary encoded pixels that defines an operation event code.

10. The method of claim 9, wherein the first identification value and the second identification value uniquely identify the start and end of the operation for the event code.

11. The method of claim 10, wherein the identification of the first encoded watermark and the identification of the second encoded watermark have defined values that sum to a predetermined value.

12. The method of claim 1, further comprising receiving from a client an action request to be executed at the server, wherein the operation is initiated in response to the action request.

13. The method of claim 1, further comprising:
defining a workload at the server, the workload defining a plurality of operations; and sequentially executing each of the operations of the workload.

14. The method of claim 13, further comprising receiving from the client a key event to trigger initiation of each of the operations of the workload.

15. The method of claim 13, further comprising upon failure of an operation after retrying the operation the preset number of times, ignoring additional operations of the workload relating to a same application as the failed operation.

16. The method of claim 13, further comprising periodically detecting the progress of the operations of the workload, and terminating the workload if no progress is detected.

17. A method for measuring performance at a client of virtual desktop services offered by a server, the client including a processor, the method comprising:
polling image updates to a user interface display generated by a virtual desktop, the image updates being received at the client from the server;
detecting a first encoded watermark in the display indicating initiation of an operation at the server, the first encoded watermark including a distinct first location, a second location, and a third location, wherein the first location, second location, and third location are defined as specific locations within the first encoded watermark, and wherein the first location includes pixels encoding an identification of the first encoded watermark and the second location includes pixels encoding a first identification value corresponding to an application executing on the virtual desktop and a start time of an operation within the;
detecting a second encoded watermark in the display indicating completion of the operation, the second encoded watermark including the first location, the second location, and the third location, wherein the first location includes pixels encoding an identification of the second encoded watermark and the third location includes pixels encoding a second identification value corresponding to an end time of the operation for the application; and
storing in memory an action performance time, the action performance time being a time difference between detection of the first encoded watermark and detection of the second encoded watermark.

18. The method of claim 17, wherein the first encoded watermark indicates the initiation of the operation at the server by having pixels encoding an event code located at the second location within the first encoded watermark and the second encoded watermark indicates the completion of the operation by having pixels encoding the event code located at the third location within second encoded watermark.

19. The method of claim 17, wherein the identification of the first encoded watermark and the identification of the second encoded watermark comprise values summing to a predefined value.

20. The method of claim 17, wherein:
the first encoded watermark indicates the initiation of the operation at the server by having pixels encoding an operation identifier located at the second location within the first encoded watermark;
the second encoded watermark indicates the completion of the operation at the server by having pixels encoding the operation identifier located at the third location within the second encoded watermark; and
wherein the start location and the end location have different locations within the display.

21. The method of claim 17, wherein the operation is a video playback operation, the detection of the first encoded watermark at the client triggering activation of a video plug-in at the client for detecting encoded information in the video, and the detection of the second encoded watermark at the client triggering deactivation of the video plug-in.

22. The method of claim 17, wherein each of the first and second encoded watermarks comprise a plurality of binary-encoded pixels.

23. The method of claim 22, wherein the first encoded watermark and the second encoded watermark each include a first set of binary encoded pixels defining the first or second identification value and a second set of binary encoded pixels defining the operation event code.

24. The method of claim 17, further comprising, sending an action request to be executed at the server, the action request triggering initiation of the operation at the server.

25. The method of claim 17, further comprising, sending a key event to the server, the server having a workload defining a plurality of operations to be sequentially executed, the key event triggering initiation of an operation of the workload.

26. A method of measuring performance of a virtual desktop infrastructure, the method comprising:
creating a plurality of virtual desktops within a virtual desktop infrastructure, the plurality of virtual desktops each comprising a virtual machine running a guest operating system and having installed a plurality of desktop applications intended for interaction by users, the plurality of virtual desktops running on a number of hosts, each host being a physical computer system, the number of hosts being fewer than a number of the virtual desktops;
creating a plurality of virtual clients within a virtual client infrastructure, the virtual client infrastructure comprising a plurality of virtual clients each comprising a virtual machine with virtual desktop client software running thereon, each virtual client being configured to receive display updates of user displays from a corresponding one of the virtual desktops;
transmitting a workload definition to each of the virtual desktops, the workload definition identifying a sequence of operations to be performed with one or more of the installed desktop applications, each of the operations having a corresponding operation event code;
automatically performing at each virtual desktop the sequence of operations, the performing including overlaying a first watermark at a start of each operation, the first watermark including a distinct first location, a second location, and a third location, wherein the first location, second location, and third location are defined as specific locations within the first encoded watermark, and wherein the first location includes pixels encoding an identification of the first encoded watermark and the second location includes pixels encoding a first identification value corresponding to the start of the first operation, detecting a completion of the operation and embedding a second watermark at the completion of each operation, the second watermark including the first location, the second location, and the third location, wherein the first location includes pixels encoding an identification of the second encoded watermark and the third location includes pixels encoding a second identification value corresponding to the completion of the first operation;
receiving at each of the virtual clients display updates including the first and second watermarks; and
receiving from each of the virtual clients at a central location action performance times for each of the operations defined in the workloads and calculating a performance metric based at least in part on the performance times received from the virtual clients.

* * * * *